United States Patent [19]
Graham et al.

[11] Patent Number: 5,584,201
[45] Date of Patent: *Dec. 17, 1996

[54] ELEVATED TEMPERATURE METAL FORMING LUBRICATION METHOD

[75] Inventors: Edgar E. Graham, Lyndhurst; Roger M. Koeberle, Solon; Thomas C. Coneglio, Chagrin Falls, all of Ohio; Raj D. Bedi, Farmington Hills, Mich.

[73] Assignee: Cleveland State University, Cleveland, Ohio

[ * ] Notice: The portion of the term of this patent subsequent to Jul. 15, 2014, has been disclaimed.

[21] Appl. No.: 559,850

[22] Filed: Nov. 20, 1995

[51] Int. Cl.⁶ .............................. B21B 45/02; B21B 45/00
[52] U.S. Cl. ...................... 72/42; 72/46; 508/433
[58] Field of Search ...................... 72/42, 46, 39; 252/29

[56] References Cited

U.S. PATENT DOCUMENTS

| | | | |
|---|---|---|---|
| 4,612,127 | 9/1986 | Uematsu et al. | 72/42 |
| 4,869,764 | 9/1989 | Marwick | 72/42 |
| 5,139,876 | 8/1992 | Graham et al. | 428/420 |
| 5,495,737 | 3/1996 | Graham | 72/42 |

*Primary Examiner*—Lowell A. Larson
*Assistant Examiner*—Rodney A. Butler
*Attorney, Agent, or Firm*—John F. McDevitt

[57] ABSTRACT

An improved method to lubricate a metal workpiece at elevated working temperatures is described employing a novel liquid lubricant preparation which includes a vaporizable and polymerizable alkyl aromatic phosphate ester in combination with a die release agent selected from the group consisting of an organic binder and a fatty acid soap, to include mixtures thereof. The applied preparation forms a solid polymer lubricant in the forming die at the elevated working temperatures enabling lower applied pressures to be employed while producing superior workpieces.

14 Claims, 2 Drawing Sheets

ELEVATED TEMPERATURE METAL FORMING LUBRICATION METHOD

BACKGROUND OF THE INVENTION

This invention relates generally to an improved method for lubrication of metal workpieces being formed at elevated temperatures of at least 250° C. and higher and more particularly to a novel lubricant combination for such method of metal forming which includes formation of an improved polymer lubricant in situ at the elevated working temperatures.

Various lubrication means are known whereby metal workpieces being formed at elevated temperatures with one or more die members, such as by forging or extrusion, are provided with lubrication both prior to and during the metal forming operations. Both workpieces and die members are often heated to very elevated temperatures, particularly if ferrous metals are being formed, with lubricant often being supplied in copious quantities to provide both lubrication and cooling of the die members. For example, U.S. Pat. No. 2,821,016 describes the hot forging of steel billets or slugs preheated at temperatures up to 2300° F. and thereafter formed with movable and fixed die members being maintained with the liquid lubricant below 1000° F. In doing so, the die members are now conventionally flooded with a lubricating solution of colloidal graphite suspended in water containing a soluble oil. While such lubrication is reported to prevent "score" marks on the forged product and die members, it has also been found that considerable cleaning of these articles is required to remove adherent carbon particles.

Other water-based lubricants have similarly been employed which are said to provide a better lubrication means than achieved with "oil-base" suspensions of graphite and still other particulates. For example, there is disclosed in U.S. Pat. No. 4,401,579 a lubricant composition employing fumaric acid salts as the primary lubricating and release agent for use in forging operations. As therein employed, such lubricant compositions can further include other suitable thickeners and polymethacrylates, polyvinyl alcohol, starch, gelatin, gum arabic and polysaccharides along with surfactants, wetting and dispersing agents. Suitable use of such lubrication means is further said to include other metal forming operations such as drawing, press forming, extrusion, wire drawing and other processes where workpiece temperatures reach at least about 800° F. In a reported test the die members were preheated to 500° F. with the die members being sprayed with the disclosed lubricant while low carbon steel billets heated to 2150° F. were being forged therein. A different lubricating composition is disclosed in U.S. Pat. No. 4,765,917 for use in elevated temperature metal forming operations. This water-based lubricant is said to comprise about one percent to about forty percent by weight of a polycarboxylic acid salt reaction product, such as trimellitic acid and an alkyli metal or an alkaline earth metal hydroxide such that the pH of the composition is about 6.5 to about 10 along with about 0.1 percent to about 12 percent by weight of a water dispersable thickening agent, and the balance water. Such water-based lubricant is said to further optionally include extreme pressure additives, performance enhancers and biocidal agents. Representative extreme pressure additives are said to include phosphate esters while listed performance enhancers include ammonium phosphate and alkyl-metal polyphosphates. As therein employed, such lubricant composition is reported suitable in hot forging processes and other metal forming operations such as drawing, press forming, extrusion, wire drawing and like processes where workpiece temperatures generally reach at least about 1100–1300° F. for aluminum pieces and 1300–2300° F. (generally 1800–2000° F.) for steel workpieces. The average die temperatures are reported to be about 600° F. with die temperatures varying from about 250° F. to 900° F. A reported test for hot drawing of steel artillery shell casings supplied such lubricant to the preheated punch or ram members over a time period varying between eight to eleven seconds with said time period said to be less than a twenty second spray period previously required with another prior art lubricant.

In a still pending continuation application Ser. No. 08/381,144 entitled "Elevated Temperature Metal Forming Lubrication Method", filed Jan. 30, 1995 in the name of Edgar Earl Graham and assigned to the present assignee, there is described a novel lubricant combination for such method of metal forming which includes formation of a novel polymer lubricant at the elevated working temperatures. In said method of lubrication, a vaporizable and polymerizable organic reactant selected from the group of phosphate esters and phosphazene compounds is applied to form a solid polymer lubricant in situ upon contacting the forming die with a preheated workpiece. A water-based emulsion containing such organic reactant can be applied directly to the shaping region of the forming die as well as further applied to the preheated metal workpiece in carrying out the disclosed lubrication means. Comparative test results reported in said pending application found superior die lubrication to have been achieved with the disclosed lubrication means to include a five percent reduction in forming pressures when utilizing a commercially available tertiary butylphenyl phenyl phosphate as the polymer forming lubricant.

Still another pending application Ser. No. 08/275,449 entitled "Elevated Temperature Metal Forming Lubrication" filed Jul. 14, 1994 also in the name of Edgar Earl Graham and assigned to the present assignee, discloses further improved lubrication means employing the same class of polymer forming organic reactants in combination with graphite particulates. More particularly, an addition of approximately 0.5 percent by volume graphite particulates in the aqueous emulsion containing the previously employed commercial butylphenyl phenyl phosphate ester enabled significantly lower working pressures to be utilized. Additionally, such combined lubrication means were found to enable considerable more satisfactory workpieces to be formed than was produced with such precursor organic reactant alone at much higher applied pressures. Representative phosphate esters disclosed for use in both of said commonly assigned pending applications include triaryl phosphate esters such as tricresyl phosphate and triphenyl phosphate, mixed cresyl-xylenyl phosphates and cresyl diphenyl phosphates.

It is one object of the present invention, therefore, to provide a still further improved method for lubrication of metal workpieces being formed at elevated temperatures utilizing novel lubrication means.

It is still another object of the present invention to provide improved lubrication means for metal workpieces being formed at elevated temperatures with superior lubricant compositions.

It is a still further object of the present invention to provide a novel method for lubrication of metal workpieces being formed at elevated temperatures which employs relatively low lubricant levels at further reduced working pressures.

These and further objects of the present invention will become apparent upon considering the following detailed description of the present invention.

SUMMARY OF THE INVENTION

It has now been discovered, surprisingly, that still more effective and efficient lubrication is provided when forming a metal workpiece in a forming die at forming temperatures of at least 250° C. upon utilizing a novel class of starting lubricants. More particularly, the employment of liquid lubricant preparations containing a vaporizable and polymerizable alkyl aromatic phosphate ester in combination with a die release agent selected from the group consisting of an organic binder and a fatty acid soap enables both workpiece formation at significantly further reduced working pressures while also producing excellent die release with little residue from the lubricant adhering to the formed workpiece. Suitable phosphate esters in the starting lubricant preparation include polyoxyethylene oleyl ether phosphate, triphenyl phosphate esters alkylated with single and multiple propyl, butyl and octyl groups as well as mixtures these esters. For example, a mixture of monobutyl triphenyl phosphate, dibutyl triphenyl phosphate and tributyl triphenyl phosphate now commercially available from FMC Corporation under the trade name Durad 620B can be employed to form the desired polymer lubricant in accordance with the present invention. In doing so, a water-based emulsion containing at least 0.5 percent by volume of such organic reactant with the above specified additives can be applied to the shaping region of the forming die while carrying out the elevated temperature forming procedure hereinafter further described. Suitable organic binders in the present water-based emulsion include conventional ligno sulfonates and water-soluble cellulose compounds while suitable fatty acids include conventional fatty acid ethoxalate, glyceride tall oil and fatty acid soaps to further serve as emulsifying agents in the starting lubricant. Said water-based lubricant can still further include an alkanol amine employed to maintain alkaline behavior as well as already known water-disperable anti-wear and extreme pressure agents, biocidal agents and the like being employed for customary purposes.

The above noted improvements afforded with employment of the present starting lubricant preparation can be applied to a wide variety of already known manufacturing procedures. Thus, existing manufacturing procedures which forge steel, titanium and nickel products from the heated billets in a continuous manner can be further improved with the present lubrication means. Application of the present lubricant composition can be carried out prior to conducting the actual metal forming procedures as well as during an otherwise conventional metal forming process of this type. Employment of the present starting lubricant preparation can also be utilized with a wide variety of forming dies including single die members having an internal cavity wherein the heated metal workpiece is formed as well as multiple cavity die members and multi-part die constructions. Similarly the present polymer lubricant forming preparation can be applied to the die construction alone as well as being applied to both heated metal workpiece and die construction while further having said die construction also being maintained at a sufficiently elevated temperature to remove liquid from the applied preparation.

Basically, the essential steps in the presently improved metal forming procedure being carried out at forming temperatures of at least 250° C. requires (a) contacting the shaping region of the forming die with the selected starting lubricant preparation containing a vaporizable and polymerizable alkyl aromatic phosphate ester in combination with a die release agent selected from the group consisting of an organic binder and a fatty acid soap, (b) polymerizing the applied alkyl aromatic phosphate upon further contacting the shaping region of the forming die with a metal workpiece preheated to at least 800° C. to form a solid polymer lubricant in situ, (c) forming the preheated metal workpiece in the lubricated forming die, and (d) removing the formed workpiece from the forming die. In a representative hot forging operation employing the present starting lubricant compositions with a ferrous alloy workpiece heated to at least 800° C. in a ferrous alloy forging die heated to around 150° C., the presently improved method employs the steps of (a) contacting the shaping region of the forging die under ambient conditions and while preheated at the specified elevated temperature with a water-based emulsion containing at least 0.5 percent by volume of a vaporizable and polymerizable alkyl aromatic phosphate ester, an organic binder and a fatty acid soap, (b) polymerizing the applied alkyl aromatic phosphate ester upon further contacting the shaping region of the forging die with the preheated workpiece to form a solid polymer lubricant in situ, (c) forging the preheated workpiece in the lubricated forging die, and (d) removing the forged workpiece from the forging die.

DETAILED DESCRIPTION OF THE PREFERRED EMBODIMENTS

Figure 1:
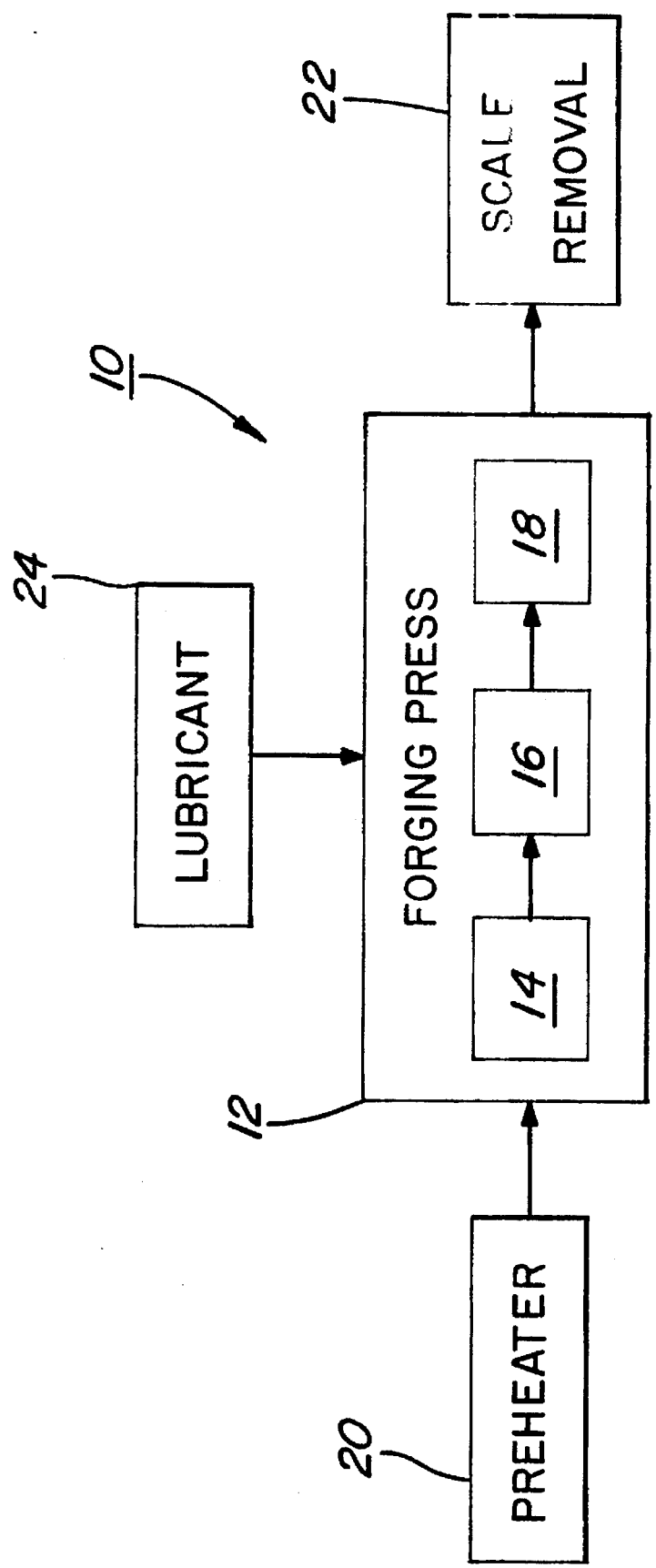
FIG. 1 is a block diagram illustrating representative forging equipment employed to conduct metal forming according to the present invention.

There is depicted in FIG. 1, a block diagram representing typical hot forging equipment 10 which can be employed to form the organic polymer lubrication means of the present invention. Said conventional press apparatus 10 utilizes a commercially available 1300 ton press 12 sold by the Viking Forge Corporation, Streetsboro, Ohio, in combination with three sets of fixed and movable die members 14, 16 and 18 being employed in a sequential manner. In customary practice, a steel workpiece is first preheated by induction heater 20 to about 2000° F. and transferred to the cooperating fixed and movable heated die members (not shown) in die set 14 for an initial forming step taking place with about 200 tons of applied pressure. Said workpiece is then immediately transferred to the cooperating die members of intermediate die sets 16 where principal forming of the workpiece takes place at elevated working temperatures often exceeding 250° F. while applied pressures reach 1400 tons and greater. A final finishing step in forming the still heated workpiece to the desired shape and size is formed in die set 18 at applied pressures of about 1000 tons. Any surface scale formed during said forging process is thereafter generally removed from the finished article with shot-blasting or similar means 22. Heretofore, the die cavities (not shown) in all three die sets were flooded prior to the forging steps with a water-based lubricant 24 containing about sixteen percent by volume of graphite lubricant at a rate of 50–55 gallons of said prior art lubricant being employed to forge 1045 steel workpieces during an eight hour work period in die sets constructed with H13 steel alloy. Such conventional lubrication means for steel forging has produced some undesirable sticking of the steel workpiece in the forming die cavities leading to premature failure of the die sets through rapid wear and destruction. An additional problem encountered with employment of said conventional lubrication means in the illustrated forging equipment is believed again due to insufficient lubrication being provided at elevated working temperatures varying between 250° F. up to 900° F. which produced higher and desirable applied pressures being required during the intermediate forming step in excess of 1400 tons applied pressure.

In contrast thereto, much superior die lubrication is experienced in the above illustrated equipment embodiment upon substituting a representative starting lubricant composition according to the present invention. The specific water-based lubricant being substituted contained in parts by weight 2 parts alkanol amine (CAS No. 102-71-6), 1 part conventional biocidal agent, 5 parts ligno sulfonate (CAS No. 8061-52-7), 5 parts antiwear agent (CAS No. 7772-98-7), 5 parts extreme pressure agent (CAS No. 57816-24-7), 7 parts Durad 620B phosphate ester (CAS No. 68937-40-6), 1 part cellulose binder (CAS No. 9004-32-4), 42 parts water, 1 part fatty acid ethoxalate (CAS No. 61791-00-2), 1 part gylceride tall oil (CAS No. 61789-12-6), and 30 parts fatty acid soap (CAS No. 124-04-9 and 1310-73-2).

Figure 2:
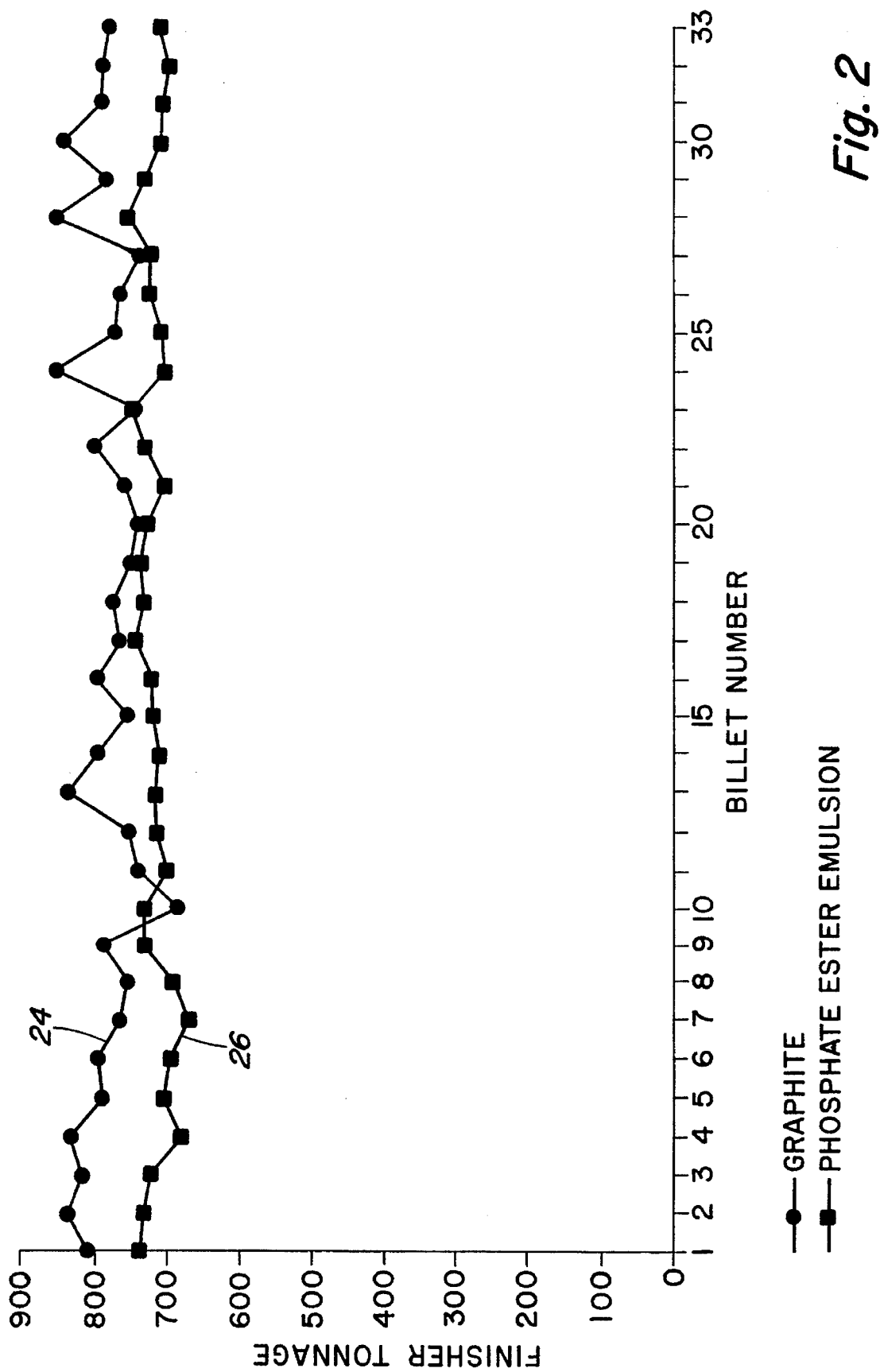
FIG. 2 is a graph enabling comparison to be made between lubrication provided with prior art graphite lubricant and that afforded in accordance with the present invention.

Comparative test results for said improved lubrication means are depicted in FIG. 2. As therein shown, the applied pressure for intermediate die set 16 in the above illustrated forging equipment is reported for the particular lubricant composition being employed. Plot 24 lists applied pressure values measured for successive number of steel workpieces being processed with said conventional graphite lubrication. Plot 26 provides the same measurements for said workpieces with lubrication being provided with the herein illustrated phosphate containing water-based emulsion. As can be seen from said comparison, the latter lubrication means in accordance with the present invention demonstrates a consistently lower applied pressure to be required for production of a satisfactory workpiece than experienced with conventional graphite lubrication. Surprisingly, such lower applied pressures afforded with the present starting lubricants are also found to be far below that reported in the above referenced commonly assigned pending applications wherein phosphate ester containing water-based lubricants were also being utilized. A still further benefit noted in conducting said evaluation is the absence of adherent graphite particles on the forged articles when employing the lubrication means of the present invention whereas articles lubricated with the conventional graphite lubrication required considerable graphite removal. Finished articles produced with the present starting lubricants are found to have a residual slippery surface coating but with such coating thickness being less than previously observed which is likewise desirable.

It will be apparent from the foregoing description that broadly useful and novel means have been provided to continuously lubricate metal workpieces being formed at elevated working temperatures of at least 250° C. It is contemplated that the present lubrication method can be applied to a broad range of metal forming processes other than above illustrated, however, to include drawing, extrusion, wire drawing and still other elevated temperature metal working processes. Likewise it is contemplated that the liquid lubricant compositions being applied in the present method of lubrication can be further modified for improved performance to include possible incorporation of surfactants and other emulsifiers to the disclosed emulsions for increased stability during storage and use. Consequently, it is intended to limit the present invention only by the scope of the appended claims.

What we claim as new and desire to secure by Letters Patent of the United States is:

1. A method of forging a metal workpiece preheated to at least 800° C. with a metal forging die at forming temperatures of at least 250° C. which comprises the steps of:
    (a) contacting the shaping region of the forging die with an aqueous lubricant prepration containing at least 0.5 percent by volume of a vaporizable and polymerizable alkyl aromatic phosphate ester in combination with a die release agent selected from the group consisting of an organic binder and a fatty acid soap,
    (b) vaporizing the applied alkyl aromatic phosphate ester at the elevated forming terrmpatures,
    (c) polymerizing the vaporized alkyl aromatic phosphate ester in the vapor phase upon further contacting the shaping region of the forging die with the preheated workpiece to form a solid polymer lubricant in the shaping region of the forging die,
    (d) forming the preheated metal workpiece in the lubricated forging die, and
    (e) remoing the formed workpiece from the forging die.

2. The method of claim 1 wherein forming of the workpiece is carried out under atmospheric conditions.

3. The method of claim 1 wherein the metal workpiece is a ferrous alloy.

4. The method of claim 1 wherein both forging die and preheated metal workpiece are contacted with the liquid lubricant preparation.

5. The method of claim 1 wherein the liquid lubricant preparation comprises a water-based emulsion.

6. The method of claim 1 wherein the forging die includes a pair of cooperating die members.

7. The method of claim 5 wherein the water-based emulsion includes a alkaline buffering agent.

8. The method of claim 5 wherein the water-based emulsion includes an extreme pressure agent.

9. The method of claim 6 wherein the cooperating die members comprise a fixed member and a movable member.

10. A method of hot forging a ferrous alloy workpiece preheated to at least 800° C. in a ferrous alloy forging die heated to about 150° C. which comprises the steps of:
    (a) contacting the shaping region of the forging die under ambient conditions and while preheated at the specified elevated temperature with a water-based emulsion containing at least 0.5 percent by volume of a vaporizable and polymerizable alkyl aromatic phosphate ester, an organic binder and a fatty acid soap,
    (b) vaporizing the applied alkyl aromatic phosphate ester at the elevated froming temperature,
    (c) polymerizing the vaporized alkyl aromatic phosphate ester in the vapor phase upon further contacting the shaping region of the forging die with the preheated workpiece to form a solid polymer lubricant in the shaping region of the forging die,
    (d) forging the preheated workpiece in the lubricated forging die, and
    (e removing the forged workpiece from the forging die.

11. The method of claim 10 wherein the water-based emulsion further contains an alkaline buffering agent and an extreme pressure agent.

12. The method of claim 10 wherein the alkyl aromatic phosphate ester is butylated triphenyl phosphate.

13. The method of claim 12 wherein the alkyl aromatic phosphate includes both monobutylated and polybutylated triphenyl phosphate.

14. The method of claim 13 wherein the alkyl aromatic phosphate includes a mixture of monobutyl triphenyl phosphate, dibutyl triphenyl phosphate and tributyl triphenyl phosphate.

* * * * *